United States Patent
Buteau et al.

(10) Patent No.: US 12,359,952 B2
(45) Date of Patent: *Jul. 15, 2025

(54) VEHICLE BODY FUEL CONSUMPTION DETERMINATION BASED ON SENSOR DATA

(71) Applicant: The Heil Co., Chattanooga, TN (US)

(72) Inventors: Richard Buteau, Austin, TX (US); Thomas Leon Wilding, Willard, UT (US); Albert Xiaoxia Jiang, Chattanooga, TN (US); John Forrest Smith, Fort Payne, AL (US); Michael Dean Geary, Toronto (CA); Brian Huston Ham, Huntsville, AL (US)

(73) Assignee: The Heil Co., Chattanooga, TN (US)

( * ) Notice: Subject to any disclaimer, the term of this patent is extended or adjusted under 35 U.S.C. 154(b) by 294 days.

This patent is subject to a terminal disclaimer.

(21) Appl. No.: 18/084,162

(22) Filed: Dec. 19, 2022

(65) Prior Publication Data

US 2023/0124529 A1    Apr. 20, 2023

Related U.S. Application Data

(63) Continuation of application No. 17/108,778, filed on Dec. 1, 2020, now Pat. No. 11,530,940, which is a
(Continued)

(51) Int. Cl.
*G01M 15/04*    (2006.01)
*G01F 9/00*    (2006.01)

(52) U.S. Cl.
CPC ........... *G01F 9/001* (2013.01); *G01M 15/044* (2013.01)

(58) Field of Classification Search
CPC ...... G01M 15/04; G01M 15/044; G01F 9/001
See application file for complete search history.

(56) References Cited

U.S. PATENT DOCUMENTS

| 5,303,163 | A | 4/1994 | Ebaugh |
|---|---|---|---|
| 10,859,419 | B2 | 12/2020 | Buteau et al. |

(Continued)

FOREIGN PATENT DOCUMENTS

| WO | WO 2015187679 | 12/2015 |
|---|---|---|
| WO | WO 2016110693 | 7/2016 |

OTHER PUBLICATIONS

Office Action in Canadian Appln. No. 3,055,184, mailed on Nov. 28, 2023, 6 pages.

(Continued)

*Primary Examiner* — Eric S. McCall
(74) *Attorney, Agent, or Firm* — Fish & Richardson P.C.

(57) ABSTRACT

Techniques are described for determining an amount of fuel that is consumed by the body components of a vehicle, based at least partly on sensor data describing the operations of the body components and/or the location of the vehicle. A vehicle is equipped with a body that has any suitable number of body components that perform operations not directly associated with the translational movement of the vehicle from one location to another. Fuel is consumed to provide power (e.g., through power take off) to operate the body components. The vehicle includes sensor device(s) configured to sense the operations of the body components and generate sensor data that describes the operations of the body components. The sensor data is analyzed to determine an amount of fuel that is consumed to power the operations of the body components.

20 Claims, 5 Drawing Sheets

Related U.S. Application Data continuation of application No. 15/908,485, filed on Feb. 28, 2018, now Pat. No. 10,859,419.

(60) Provisional application No. 62/563,219, filed on Sep. 26, 2017, provisional application No. 62/465,544, filed on Mar. 1, 2017.

(56) References Cited

U.S. PATENT DOCUMENTS

| 11,530,940 | B2 | 12/2022 | Buteau et al. |
| 2005/0010479 | A1 | 1/2005 | Hannigan et al. |
| 2007/0050193 | A1 | 3/2007 | Larson |
| 2010/0280734 | A1 | 11/2010 | Brinton et al. |
| 2011/0202591 | A1 | 8/2011 | Reis et al. |
| 2013/0178328 | A1 | 7/2013 | Arsenault et al. |
| 2014/0006329 | A1 | 1/2014 | Hu et al. |
| 2017/0102244 | A1 | 4/2017 | Meredith et al. |
| 2018/0225603 | A1 | 8/2018 | Rodoni |
| 2018/0252567 | A1 | 9/2018 | Buteau et al. |
| 2021/0131849 | A1 | 5/2021 | Buteau et al. |

OTHER PUBLICATIONS

Ahn et al., "The effects of route choice decisions on vehicle energy consumption and emissions," Virginia Tech Transportation Institute, dated May 2008, 34 pages.

International Preliminary Report on Patentability in International Appln. No. PCT/US2018/020281, dated Apr. 12, 2019, 14 pages.

International Search Report and Written Opinion in International Appln. No. PCT/US2018/020281, dated Jun. 19, 2018, 11 pages.

Office Action in Canadian Appln. No. 3,055,184, mailed on Sep. 25, 2024, 5 pages.

VEHICLE BODY FUEL CONSUMPTION DETERMINATION BASED ON SENSOR DATA

CROSS-REFERENCE TO RELATED APPLICATIONS

The present disclosure is a continuation of U.S. patent application Ser. No. 17/108,778, titled "Vehicle Body Fuel Consumption Determination Based On Sensor Data," filed on Dec. 1, 2020, which is a continuation of U.S. patent application Ser. No. 15/908,485, titled "Vehicle Body Fuel Consumption Determination Based On Sensor Data," filed on Feb. 28, 2018, now U.S. Pat. No. 10,859,419, which is related to, and claims priority to, U.S. Provisional Patent Application No. 62/563,219, titled "Vehicle Body Fuel Consumption Determination Based On Sensor Data," filed on Sep. 26, 2017, and U.S. Provisional Patent Application No. 62/465,544, titled "Vehicle Body Fuel Consumption System," filed on Mar. 1, 2017, all of which applications are incorporated by reference, in their entirety, into the present disclosure.

BACKGROUND

Various types of vehicles have body components that perform operations not directly associated with the operations of the engine, drive components, or other components that enable the translational movement of the vehicle from one location to another. For example, a moveable crane includes body components that operate to grasp, lift, lower, and otherwise move objects, a cement truck includes body components that operate to mix and pour cement, and a refuse vehicle (e.g., garbage truck) includes body components that may operate to collect and transport refuse. Such vehicles consume fuel to perform the operations of the body components, as well as to move the vehicle between locations.

SUMMARY

Implementations of the present disclosure are generally directed to determining vehicle fuel consumption that is due to operations of body components of the vehicle. More particularly, implementations of the present disclosure are directed to collecting sensor data that measures the state and/or activity of body components of a vehicle, and/or sensor data that describes the location, velocity, and/or acceleration of the vehicle, and using the sensor data to identify a portion of the vehicle's fuel consumption that is due the operations of body components and that is not directly the result of moving the vehicle between locations.

In general, innovative aspects of the subject matter described in this specification can be embodied in methods that include actions of: receiving sensor data describing at least one operation that is performed during a time period by at least one body component of a vehicle, wherein the at least one body component does not provide translational movement of the vehicle between locations; analyzing the sensor data to determine a first amount of fuel that is consumed by the vehicle, during the time period, to perform the at least one operation of the at least one body component; calculating a second amount of fuel as a difference between the first amount and a total amount of fuel consumed by the vehicle during the time period; and providing fuel consumption information that at least describes the second amount of fuel that is consumed by the vehicle during the time period.

These and other implementations can each optionally include one or more of the following innovative features: the vehicle is a garbage collection vehicle; the at least one body component performs the at least one operation to collect garbage; the at least one operation includes a power take off (PTO) operation to provide power, from an engine of the vehicle, to operate the at least one body component; the actions further include receiving location data describing at least one location of the vehicle during the time period; the actions further include correlating the location data with map information indicating that the at least one location is private; the actions further include modifying the second amount of fuel to subtract fuel consumed by the vehicle while at the at least one private location; determining the first amount of fuel further includes determining, based on the sensor data, an amount of time that each of the at least one body component is operated during the time period, determining an amount of power expended to operate each of the at least one body component based at least partly on the respective amount of time, and determining the first amount of fuel based on the amount of power expended to operate each of the at least one body component; the amount of power expended to operate each of the at least one body component is further based on at least one environmental condition at a location of the vehicle; the at least one environment condition includes one or more of an air temperature, an air pressure, an altitude, a wind condition, and a precipitation condition; and/or determining the amount of power expended to operate each of the at least one body component is further based on previously determined power expenditure information that describes the power to operate the respective body component.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
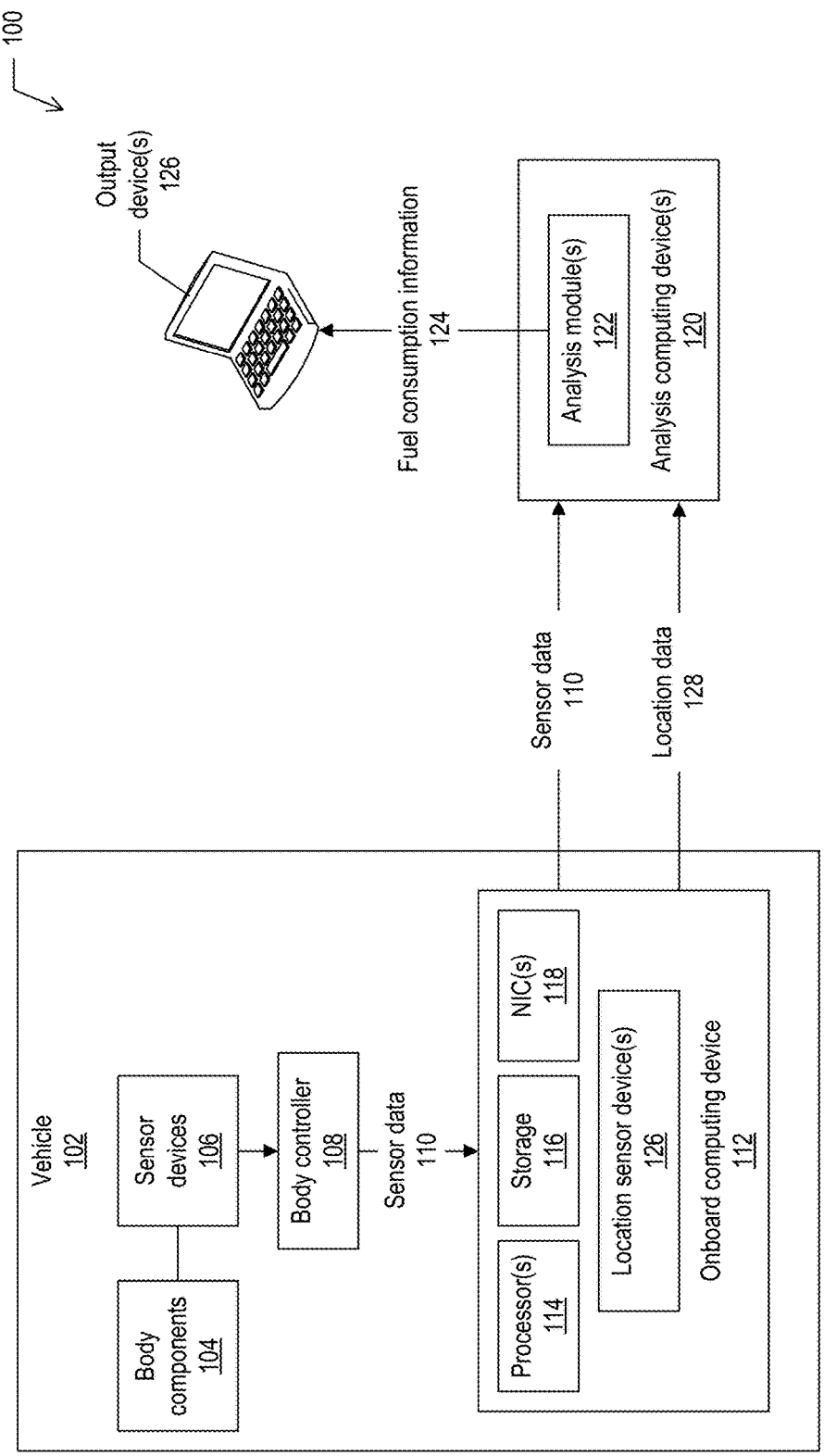
FIGS. 1A and 1B depict example systems for fuel consumption determination, according to implementations of the present disclosure.

Implementations of the present disclosure are directed to systems, devices, methods, and computer-readable media for determining an amount of fuel that is consumed by the body components of a vehicle based on sensor data describing the operations of the body components and/or the location of the vehicle. A vehicle is equipped with a body that has any suitable number of body components that perform operations not directly associated with the translational movement of the vehicle from one location to another. For example, a garbage collection vehicle can include various body components to grasp a garbage container, lift and empty the container into a hopper, replace the empty container on the ground, compact or otherwise arrange the garbage in the hopper, empty the hopper at a garbage collection location, and so forth. Fuel is consumed to provide power to the body components for their various operations. In some instances, the fuel is consumed to generate power that is rerouted from the engine as power take off (PTO) to operate the body components through hydraulic actuation or through other mechanisms.

The vehicle includes one or more sensor devices (also described as sensors), which are configured to sense the operations of the body components and generate sensor data that describes the operations of the body components. The sensor data can also describe the powering of PTO that enables the operations of the body components. The sensor data is analyzed to determine an amount of fuel that is consumed to power the operations of the body components, and/or the proportion of the total fuel consumed by the vehicle that is used to power such operations. In some instances, an operator of a vehicle may be taxed (by some government agency) based on the amount of fuel that is consumed by the vehicle while it is driving down a public road (e.g., highway, city street, etc.). Accordingly, implementations provide an accurate technique for determining the amount of fuel that is consumed, by the vehicle, through body operations that are not directly associated with the translational movement (e.g., driving) of the vehicle. This determination can be used, in conjunction with location information describing the location of the vehicle, to accurately calculate the amount of consumed fuel that is taxable and that is not taxable. In some instances, the taxable fuel is that which is consumed to translationally move the vehicle on public roads. The other, non-taxable fuel may include that which is consumed while the vehicle is on private property and/or the fuel that is consumed to power the body component operations, such as fuel that is consumed to generate PTO to power the body components.

The body components and body component operations include those that are appropriate for the particular type of vehicle being analyzed. For example, a garbage collection vehicle may be a truck with an automated side loader (ASL). Alternatively, the vehicle may be a front loading truck, a rear loading truck, a roll off truck, or some other type of garbage collection vehicle. A vehicle with an ASL may include body components involved in the operation of the ASL, such as arms and/or a fork, as well as other body components such as a pump, a tailgate, a packer, and so forth. A front loading vehicle may include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the hopper, and/or expel the garbage from the hopper.

Sensors may be located in the body components, or in proximity to the body components, to monitor the operations of the body components. The sensors may emit signals that include sensor data describing the body component operations, and the signals may vary appropriately based on the particular body component being monitored. The sensor data is analyzed, by a computing device on the vehicle and/or by remote computing device(s), to measure the power consumed by the operations of the body components. In some implementations, the sensor data for a particular body component describes a duration of time when the body component is being operated, which may also be described as a cycle of the body component. Based on previously performed measurements of the operation of the body component, the sensor data may be analyzed to determine an amount of power consumed during the period of operation (e.g., cycle) of the body component. Based on the amount of power consumed, the amount of consumed fuel is calculated based on information describing vehicle engine's fuel intake (e.g., number of gallons, liters, etc.) per power output (e.g., horsepower). The sensor data can describe the operational period of the body component to any suitable degree of accuracy, such as within a millisecond.

In some implementations, the analysis to determine power consumed by body component operations is based on previously performed measurements that measure the power per time (or per cycle) consumed by each body component. Such empirical measurements may be re-performed periodically during the life of a body component, to recalibrate and account for any changes in the power consumption of the component as it ages or wears over time. Moreover, in some instances the power consumption of a body component may depend on environment conditions such as the ambient air temperature, air pressure and/or altitude, presence or absence of precipitation (e.g., whether there is rain, snow, sleet, hail, etc.), wind speed and/or direction, ambient light (e.g., whether it is daytime or nighttime), and so forth. The power consumption calculations may take the current environment conditions into account. Current environment conditions may be detected by sensor(s) in the vehicle, and/or may be determined based on information received from external sources, such as current weather conditions (e.g., temperature, pressure, wind, precipitation, etc.) at the current location of the vehicle.

In some implementations, the sensor data may be communicated from the sensors to an onboard computing device in the vehicle. In some instances, the onboard computing device is an under-dash device (UDU). The UDU may also be referred to as the Gateway. Alternatively, the device may be placed in some other suitable location in or on the vehicle. The sensor data may be communicated from the sensors to the onboard computing device over a wired connection (e.g., an internal bus) and/or over a wireless connection. In some implementations, a J1939 bus connects the various sensors with the onboard computing device. In some implementations, the sensors may be incorporated into the various body components. Alternatively, the sensors may be separate from the body components, and arranged to collect data regarding the body component operations. In some implementations, a sensor and/or body component digitizes the signals before sending them to the onboard computing device, if the signals are not already in a digital format.

In some implementations, the analysis of the sensor data is performed by the onboard computing device, which provides output describing the amount of fuel consumed for body operations and/or while on private property. Alternatively, the onboard computing device transits the sensor data to analysis computing device(s) (e.g., cloud computing device(s)) for analysis there. The data analysis may be performed in real time with respect to the generation of the sensor data, or may be performed (e.g., in a batch process) periodically, such as once a day.

In some implementations, the analysis of the sensor data correlates information received regarding the operation of the vehicle engine. For example, sensor data describing body operations can be correlated with engine data showing an increase in engine operation (e.g., increase in engine RPMs) that is detected when the body components are operating. Such correlation may be used to confirm and/or refine the fuel consumption estimate.

In some implementations, the fuel consumption that is determined to be caused by the body component operations during a period of time, and/or that is caused by the PTO drawn off to power the body component operations, may be subtracted from the total fuel consumed by the vehicle during the period of time, to determine the taxable amount of fuel that was consumed by the vehicle during the period of time. In some implementations, location information for the vehicle may also be employed in the analysis. The fuel consumed by the vehicle while on private property may also be subtracted from the total amount of fuel to determine the taxable amount of fuel, e.g., in instances where the taxable amount is the amount consumed for translational movement of the vehicle on public roads (e.g., alleys, streets, highways, freeways, tollways, avenues, and/or other types of public thoroughfares). In some implementations, the analysis may employ a map that indicates private parcels and/or public parcels of land, and the location of the vehicle may be compared to the map to determine periods of time when the vehicle was on private property. Fuel consumed during such periods may be subtracted from the total amount of fuel consumed, to determine the taxable amount. The location of the vehicle may be determined using a satellite-based navigation system, such as a version of the Global Positioning System (GPS), or some other suitable location determination technique. In some implementations, the sensor data may not be collected or analyzed while the vehicle is on private property, to avoid unnecessary expenditure of network capacity and processing capacity.

A large amount of sensor data may be generated by the sensors and received by the onboard computing device. In some implementations, a suitable data compression technique is employed to compress the sensor data before it is communicated, over network(s), to the remote server device(s) for analysis. In some implementations, the compression is lossless, and no filtering is performed on the data that is generated and communicated to the onboard computing device and then communicated to the remote server device(s). Accordingly, such implementations avoid the risk of losing possibly relevant data through filtering.

A vehicle may be equipped with a body having any appropriate number of body components, where each component is able to perform a cycle of operation that may be detected by the sensor(s) and described in the sensor data. An amount of fuel used to cycle the particular component is determined based on the sensor data, and the total amount of fuel used for body component operations is determined. In some implementations, the amount of fuel consumed to cycle a particular component of a vehicle and a number of cycles for each of the components cycled over a certain period of time (e.g., per day or per hour) can be used to calculate an amount of fuel consumed by activities of a vehicle body. The calculation may be performed (e.g., exactly) for a period of time and/or provided through a weighted average, and an amount of fuel consumed by body activity can be provided either through weighted averages, through actual (e.g., exactly determined) usage, or otherwise, to provide an amount of fuel used by a particular vehicle related to body activity which can be distinguished from transportation activities including translational movement of the vehicle and idling the vehicle between instances of translational movement.

Additionally, sensors can be provided on the vehicle body to evaluate cycles and/or other parameters such as the hydraulic pressure of various hydraulic components, pneumatic pressure, and/or operations of components such as the top door of a refuse vehicle, a Curotto Can® connected to a refuse vehicle, an arm cycle, a pack cycle, a tailgate open or close event, an eject event, tailgate locking event, and/or other body component operations.

In some instances, components are driven by a PTO or other fuel consuming system which can be independently monitored apart from idling and/or movement of the vehicle. The number of cycles of a specific piece of equipment can be monitored through the use of sensors and one or more processors to tally the total number of cycles in a period of time, which is then used to determine an amount of power (e.g., horsepower) expended during the cycle. The total amount of energy that is expended by the body can be determined as a sum of the power consumed by the various body components during a time period. In some implementations, the analysis provides a weighted average of power divided by the number of cycles, which can then be converted into a weighted average of fuel used per amount of energy expended. Thus, the analysis can determine the amount of fuel (e.g., gallons per hour) that is consumed, on average, by the vehicle body, by utilizing as a weighted average the use of the equipment in body component functions.

This data can be used in conjunction with information describing the operational cycles of the body components of the vehicle, such as correlating with breaks and/or identifying when the vehicle body is in use, so as to calculate the fuel expended for body operations in a period of time. For tax purposes, the owner and/or operator of the vehicle can view information describing the amount of fuel used for body activity, and apply that as a potential savings for tax expenditures.

Figure 1B:
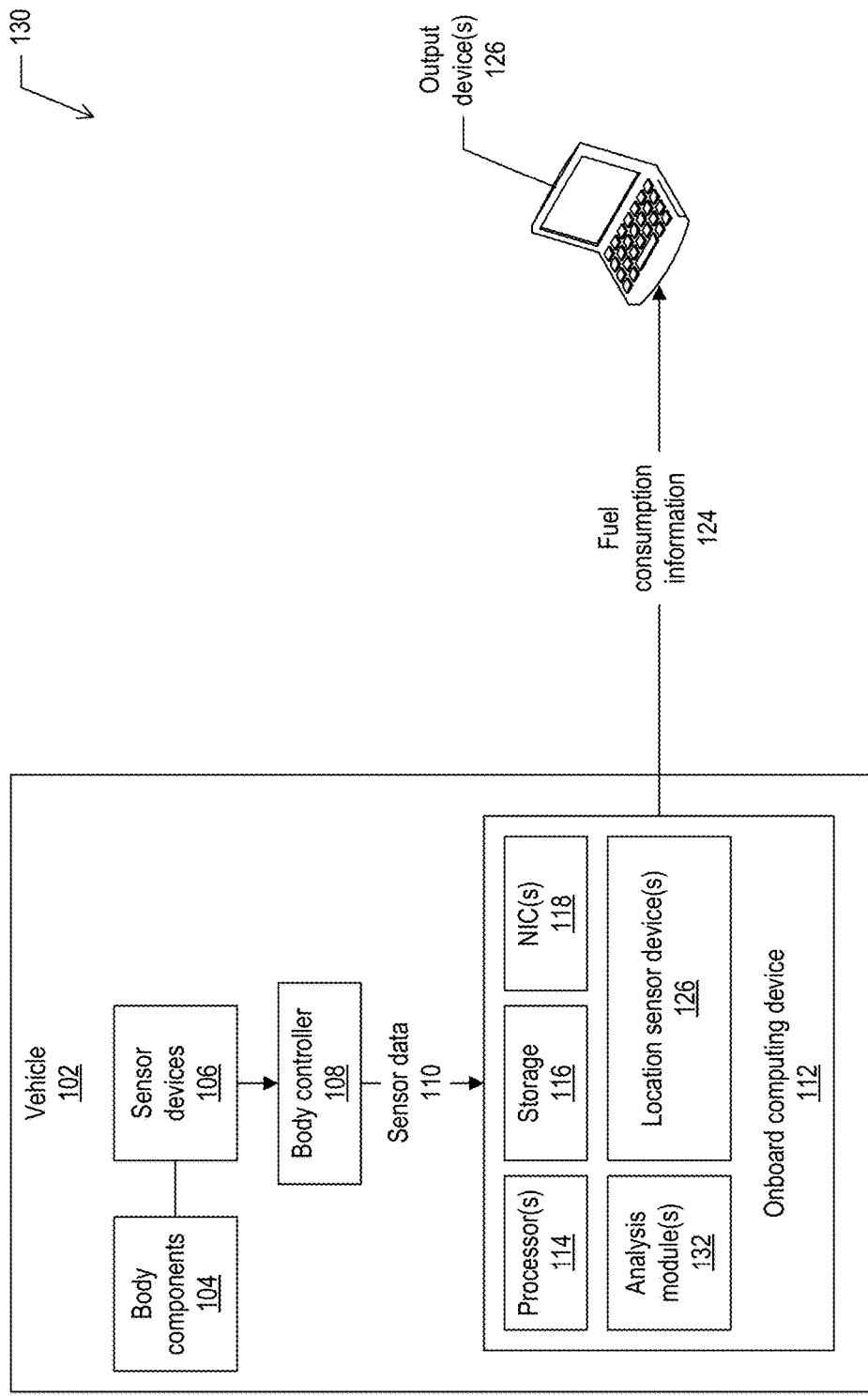

FIGS. 1A and 1B depict example systems for fuel consumption determination, according to implementations of the present disclosure. As shown in the example of FIG. 1A, a system 100 includes a vehicle 102 such as a garbage collection vehicle. The vehicle 102 can include any number of body components 104 as described above. Sensor devices 106 may be situated to monitor the operations of the body components 104 and generate sensor data 110 that describes the body component operations. In some implementations, a body controller 108 may control the operations of the body components 104, and the sensor devices 106 may send the sensor data 110 to the body controller 108, which then sends the sensor data 110 to the onboard computing device 112.

Alternatively, the sensor device(s) 106 can communicate directly with the onboard computing device 112, without using a body controller 108 as an intermediary (e.g., in environments where the body controller 108 is not present).

The sensor data 110 can be received by the onboard computing device 112. The device 112 can include processor(s) 114, local data storage 116, and/or network interface controller(s) (NIC(s)) 118 to communicate over available (wired and/or wireless) network(s). In some implementations, the device 112 also includes one or more location sensor devices 126, such as a GPS transceiver and/or processing unit, that determines a current location of the device 112 (and therefore of the vehicle 102) at various times. The location can be described in location data 128 that is used in the analysis, e.g., to determine when the vehicle 102 is on private property and not on a public thoroughfare.

In implementations illustrated by FIG. 1A, the device 112 communicates the sensor data 110 and the location data 128, over one or more networks, to one or more analysis computing devices 120 that are remote with respect to the vehicle 102. The device(s) 120 may include any suitable number and type of computing device, and may include distributed computing device(s) (e.g., cloud server(s)). The device(s) 120 execute one or more analysis module(s) 122 that analyze the sensor data 110 and/or location data 128 to determine an amount of (e.g., taxable) fuel consumed by the vehicle during one or more time periods, as described herein. The output of the analysis module(s) 122 may be provided in fuel consumption information 124 that is provided to one or more output devices 126. The output device(s) 126 may be any suitable type of computing device, and may be operated by operators who consume the fuel consumption information 124 for tax liability analysis and/or other purposes.

FIG. 1B illustrates an example system 130, in which the analysis server device(s) 120 are absent and/or not employed in the analysis. In some implementations, as shown in the example of FIG. 1B, the analysis of the sensor data and/or location data may be performed on the onboard computing device 112 itself, through operation of analysis module(s) 132 executing on the processor(s) 114. The device 112 may output the fuel consumption information 124 to the output device(s) 126. Implementations support the performance of the fuel consumption analysis, as described herein, on the analysis server device(s) 120, on the onboard computing device 112, and/or at least a partial analysis performed device 112 and the device(s) 120.

Figure 2:
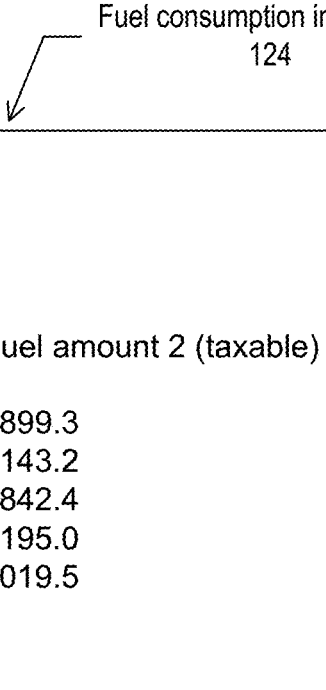
FIG. 2 depicts an example of fuel consumption information, according to implementations of the present disclosure.

FIG. 2 depicts an example of fuel consumption information 124, according to implementations of the present disclosure. As shown in the example, the fuel consumption information 124 can be provided as a report that covers a particular time period (e.g., from start date to end date). The report may list, for each of one or more vehicles identified by a vehicle ID, a first amount of fuel (e.g., non-taxable) consumed by the vehicle during the time period, and a second amount of fuel (e.g., taxable) consumed by the vehicle during the time period.

Figure 3:
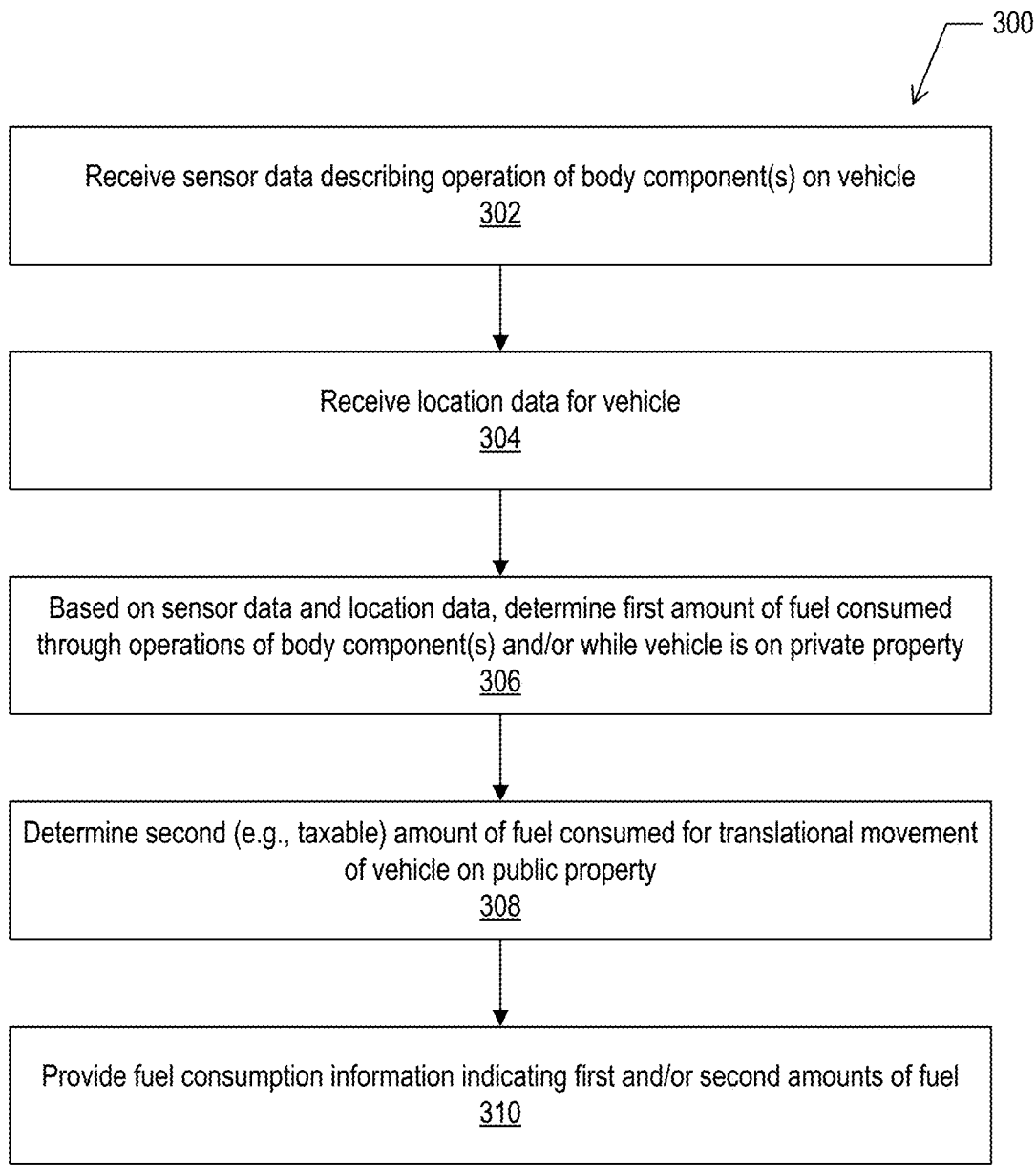
FIG. 3 depicts a flow diagram of an example process for fuel consumption determination, according to implementations of the present disclosure.

FIG. 3 depicts a flow diagram 300 of an example process for fuel consumption determination, according to implementations of the present disclosure. Operations of the process can be performed by one or more of the analysis module(s) 122, the analysis module(s) 132, and/or other software module(s) executing on the onboard computing device 112, the analysis computing device(s) 120, or elsewhere.

Sensor data is received (302). As described herein, the sensor data describes the operations of body components on the vehicle, and the sensor data is generated by various sensors monitoring the operations of the body components. Location data is also received (304), indicating the location of the vehicle at various times. Based on the sensor data and the location data, a determination is made (306) of a first amount of fuel that is consumed to power the body components and/or that is consumed while the vehicle is on private property. This first amount of fuel may be the non-taxable portion of the fuel consumed by the vehicle. A determination may also be made (308) of a second amount of fuel that is consumed through translational movement of the vehicle while the vehicle is on public roads. This second amount may be the taxable portion of the fuel consumed by the vehicle. The fuel consumption information is provided (310), describing the first amount and/or second amount of fuel.

Table 1, below, provides an example of results of a fuel consumption analysis to determine the power, and fuel, consumed by various functions of body components, such as a top door, a Curotto can, a tailgate, an eject mechanism, and so forth.

TABLE 1

| | HP for Functions | | | | | |
|---|---|---|---|---|---|---|
| | Avg GPM | Avg Pressure | HP | Gallons used per hour | CNG Diesel gal Equ | Cycles/Day |
| Top Door | 10 | 2000 | 11.66861 | 0.647536706 | 50 | 583.4306 |
| Curotto | 20 | 2000 | 23.33722 | 1.295073411 | 1000 | 23337.22 |
| HP Arm Cycle | 30 | 2000 | 35.00583 | 1.942610117 | 500 | 17502.92 |
| HP Park Cycle | 30 | 2000 | 35.00583 | 1.942610117 | 200 | 7001.167 |
| TG Open and Close | 20 | 2000 | 23.33722 | 1.295073411 | 2 | 46.67445 |
| Eject | 30 | 2000 | 35.00583 | 1.942610117 | 2 | 70.01167 |
| TG Locks | 10 | 2000 | 11.66861 | 0.647536706 | 2 | 23.33722 |
| | | Ave HP | 25.00417 | 1.387578655 | | |
| Mas Flow and Pressure | 45 | 2500 | 65.63594 | 3.642393969 | | |
| | | | | | 1756 | 48564.76 |
| | | | | | Weighted Horse Power | 27.6564697 |

TABLE 1-continued

| HP for Functions | | | | | |
|---|---|---|---|---|---|
| Avg GPM | Avg Pressure | HP | Gallons used per hour | CNG Diesel gal Equ | Cycles/Day |
| Fuel used per hour at Average HP | | | 1.387579 Gallons/hour during PTO on-time | | |
| Fuel used per hour at weighted HP | | | 1.534765 Gallons/hour during PTO on-time | | |
| Fuel used per hour at Max HP | | | 3.642394 Gallons/hour during PTO on-time | | |

In the example of Table 1, the body functions were evaluated based on their consumption of energy through hydraulic flow and/or pressure. The data is input from data acquisition sensors, which is used to calculate power consumption (e.g., in horsepower). Because some functions are used more often than others, the power consumption can be weighted. A weighted average of functions can be provided for a body. The weighted power consumption is divided by a fuel usage efficiency of the engine. In this example, the efficiency is 33%, which results in a determination that 18.022 HP/hour corresponds to one gallon of diesel fuel, as shown in Table 2 below. Other engines may exhibit other capacities and/or efficiencies.

As shown in the example of Table 1, the various sensors can be monitored to provide an input sensor data to the onboard computing device, using the J1939 protocol and/or other suitable communications protocol. The sensor data may also be provided to the remote analysis computing devices over one or more networks. As the vehicle body performs various operations, the sensor data is collected by the sensors and provided to the onboard computing device. In some implementations, the sensors send data describing the presence, or absence, of a particular event in a body component (e.g., the cycling of a component), such as the top door, a Curotto Can®, the arm cycle, the pack cycle, the tailgate open and/or close event, the ejection cycle, the operation of tailgate locks, and so forth. Sensors can also monitor operation of the PTO, hydraulic pressure, hydraulic flows, and/or other parameters.

By evaluating an average flow in fuel (e.g., gallons per minute) consumed to maintain a particular pressure of a hydraulic system from a PTO (power take off), the power (e.g., horsepower) used for a particular cycle can be determined. This power can then be correlated based on the amount of power generated by the engine of the vehicle using the known efficiency through the PTO or other conversion system. As shown in the example of Table 2, below, an amount of fuel consumed to operate the hydraulic or other system(s) can be evaluated for a particular cycle of one or more components of the vehicle body.

TABLE 2

Diesel Engine

139000 BTU, energy content per gallon of diesel fuel
33% Efficiency for a diesel engine
1 HP = 42.42 BTU/minute = 2545.2 BTU/Hr
1 Gallon of diesel = 18.02 HP-Hr. in a diesel engine
CNE engine Use DGE to calculate CNG engine fuel consumption because:
1. CNG is stored in pressured vessel. Pressure changes all the time.
2. principle of diesel and CNG engine are the same.

Referring to Table 1, for each of the individual cycles of body components, a determination can be made of the amount of energy utilized (e.g., in horsepower or other units). This determination can be used, along with the number of cycles performed in a particular period (e.g., a day), to evaluate the total energy consumed by operating that particular body component during a time period. A weighted average of the various body functions is then provided, relative to the various cycles and energy expenditures, to provide a total amount of power extended over the course of the time period (e.g., a day) by the vehicle body. Based on the total number of cycles of the various energy expenditures, an average energy expenditure per cycle can be provided for the time period. This can be converted to fuel amount (e.g., gallons) consumed per hour using a conversion such as that shown in Table 2.

Various sensors may monitor various body components. For example, a first sensor may monitor opening and/or closing of the top door, a second sensor may monitor operation or cycle of the Curotto Can®, a third sensor may monitor arm cycling events, a fourth sensor may monitor packing events, a fifth sensor may monitor tail gate opening and/or closing events, a sixth sensor may monitor ejection of material from the body, a seventh sensor may monitor tail gate locks, and so forth. Other sensors may monitor other body functions, and not all implementations necessarily monitor all of the different types of body component cycles described herein. Other body types of vehicle may entail monitoring similar or dissimilar cycles.

In some implementations, a sensor may monitor PTO operation, such as when PTO is engaged, when it reaches a predetermined characteristic (e.g., speed), when it stops, and so forth. Multiple sensors, or a single sensor, can be used to monitor a single or multiple functions. In some implementations, sensor(s) can be used to monitor hydraulic pressure and/or flow rate. Some implementations may monitor pneumatic pressures and/or flow rates, in environments that employ pneumatic systems instead of or in addition to hydraulic systems. Some implementations may monitor electrical power consumption and/or generation.

Data can be transmitted from the various sensors, and used to evaluate energy usage of the various body functions (e.g., in cycles). Once the sensor data is collected, it can be further processed for monitoring fuel consumption by the body as distinguished from fuel consumed for translational movement of the vehicle.

For some embodiments, an amount of time of operation may be multiplied by the amount of fuel (e.g., gallons) consumed per hour based on a weighted average or otherwise, and can be used to determine the fuel consumed for the body operation. This fuel consumption number can then be provided for use in reducing the tax burden to the vehicle owner and/or operator based on potential favorable tax treatment of fuel utilized for body operation as opposed to operation of the vehicle in terms of vehicle movement and/or idling. Table 2 shows the calculation of the amount of energy (e.g., horsepower hours) in an amount (e.g., gallon)

of diesel fuel used by the engine. Other engines will have other efficiencies and PTO capabilities.

A calculation can be performed to determine the fuel used to operate the body, as distinct from the fuel used for translation movement of the vehicle. First, the amount of fuel is calculated as time multiplied by the energy to do the work, as shown in the equation $F=T\times S$, where F is fuel, T is time, and S is energy (related to fuel over time). Energy for each body event can be derived using the sensors identified as monitored the particular body event, and the energy can be multiplied by the average or actual number of cycles performed in a period of time (e.g., a day). The number of total cycles for all the body functions can be divided into the total amount of energy used to provide the body functions, for a weighted average in some instances if actual numbers are not used. This figure can represent the actual energy used for the body function, and may exclude energy expended through a parasitic loss associated with fixed displacement pump versus variable placement pumps. This number can then be converted to the hourly rate of S using the conversion of Table 2.

In one example, as it relates to time, the vehicle can operate on a garbage collection route from 6:00 a.m. to 3:30 p.m. Breaks may be taken between 9:00-9:30 a.m., and between 1:00-1:30 p.m., and the unit goes to the landfill at 3:00 p.m. and is parked at 3:30 p.m. The body functions performed while collecting refuse, e.g., from 6:00-9:00 a.m., from 9:30 a.m. to 1:00 p.m., and from 1:30-3:00 p.m., can be evaluated. If the total amount of time is 9.5 hours and the amount of operation of the PTO is 4 hours and the constant S, such as is shown in Table 1, is 1.5, then the fuel consumed is 4 times 1.5 or 6 gallons. The calculated amount of fuel utilized can then be used to reduce the tax liability of the owner and/or operator through the operation of the vehicle based on a calculated performance of the vehicle in vehicle body operations which can be distinguished from vehicle transportation functions (e.g., moving and idling).

Idling calculations could be also performed to determine the amount of fuel consumption during idling. A vehicle idle start can be identified through various generated indications as well as a vehicle idle stop state. These events can be detected based on the vehicle speed being zero and/or when a vehicle idle stop state is detected in a vehicle. Vehicle speed can be obtained from the J1939 bus and/or GPS information which may be provided in various ways. Various filtering techniques can be applied, such as thirty second filtering, from a vehicle running state to a vehicle idle state change and the vehicle speed data can be written to run an hourly telemetry JSON in file, whether from a J1939 communication protocol and/or GPS data. An idling start event can be defined retroactively after the vehicle stops moving for 30 seconds, and/or based on other criteria. An idling stop event can be defined retroactively after the vehicle starts moving and continues moving for 30 seconds. Other data may be used in determining idling, speed, and/or filtering capabilities.

As described above, the servicing of the customer by a vehicle can be determined based on fuel consumption. A service event can be identified such as from receipt of various signal input from various sensors that identify when the vehicle body is doing work, such as moving the forks or various arms, and/or other motion and/or events associated with the vehicle body. GPS coordinates can be used to identify where a particular service event occurred. In some instances, the GPS data can be correlated with a data set of expected GPS locations for specific events to occur, such as known customer locations, to determine whether or not the event is in an expected location such as on private property or some other location. If it occurs within a specific location, then the time of the event can be correlated.

The beginning and end of fuel usage can be determined, based on the occurrence of the event, as an amount of fuel and/or amount of energy expended to perform a particular cycle. Fuel consumed can then be identified as the difference between the fuel used to service the customer (e.g., through body operations) and the fuel consumed when the vehicle is either moving and/or idle and not servicing the customer. Fuel consumption can also be calculated based on a hydraulic support capability, which can coordinate with the customer service capabilities and/or operation of the vehicle body apart from the vehicle movement.

By identifying the non-propulsion power fuel consumed, that data can be provided to relate to an amount of fuel consumption when the engine of a vehicle is being utilized for non-vehicle movement operations (e.g., body operations), thereby potentially reducing the amount of road tax and/or other taxes owed for the consumption of particular fuels by various companies. The data can be utilized to potentially save the company money over other companies which do not track fuel usage for non-vehicle operations.

Although examples herein describe the vehicle as a garbage collection vehicle or refuse vehicle, implementations can be used in other types of vehicles as well. For example, the techniques described herein can be used in other types of vehicles having a vehicle body that uses hydraulic, electric, pneumatic, or other types of power functions that consume fuel to perform body functions which may be separated from the fuel consumed by the vehicle in moving from one point to another and/or idling. By identifying the fuel consumed for non-vehicle movement operations, a potential fuel tax and/or other tax savings can be accomplished, which can benefit the owner and/or operator of the vehicle to potentially give one a competitive advantage and/or tax break to thereby potentially increase profit in the marketplace.

Fuel consumed by the PTO or other system using vehicle fuel to provide body functions can be measured at least partially by sensing when the PTO unit is in an ON or OFF state. This state can be determined by a sensor that is wired with wiring from the PTO unit to the body controller or processor. The body controller or processor then can transmit a signal over the J1939 network on the vehicle, or some other network, when it senses a state change (e.g., changing from ON to OFF, or from OFF to ON). These signals from the body controller can be captured by the onboard computing device (e.g., UDU or Gateway and/or microcomputer) that is monitoring for signals on the J1939 network. The onboard computing device can identify the signal, and transmit the signal through a cellular connection to the analysis server device(s) (e.g., cloud computing device(s)) and/or process the data locally. The duration between ON and OFF can be measured and fuel consumption can be calculated based on the duration.

The body controller of a vehicle can be connected to multiple sensors in the body of the vehicle. The body controller can transmit one or more signals over the J1939 network, or other wiring on the vehicle, when the body controller senses a state change from any of the sensors. These signals from the body controller are received by the onboard computing device that is monitoring the J1939 network. In some implementations, the onboard computing device has a GPS chip or other location determination devices that logs the location of the vehicle at each second or at other intervals. The onboard computing device can identify the body signals (as distinguished from vehicle signals) and transmit them, along with the location (e.g., GPS) data, to the analysis computing device(s), e.g., through a cellular connection, WiFi network, other wireless connection, or through a serial line, Ethernet cable, or other wired connection. The analysis computing device(s) can analyze the data to look for specific signals from the body controller that indicate a customer has been serviced (e.g., the forks moved or the grabber moved, etc.). The signal can be cross referenced with the GPS data to locate where (e.g., geographically) the signal was captured. The signal can then be compared to a dataset of known private parcels. The analysis can determine whether the event occurred within or outside a private parcel, to determine or verify that a specific cycle of the body occurred during that event.

In some implementations, the onboard computing device is a multi-purpose hardware platform. The device can include a UDU (Gateway) and/or a window unit (WU) to record video and audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

The onboard computing device can determine the speed and/or location of the vehicle using various techniques. CAN_SPEED can be determined using the CAN interface and using J1939 or J1962, reading wheel speed indicator. The wheel speed can be created by the vehicle ECU. The vehicle ECU can have hardware connected to a wheel axle and can measure rotation with a sensor. GPS_SPEED can provide data from GPS and be linked, such as to a minimum of three satellites and a fourth satellite to determine altitude or elevation. Actual coordinates of the vehicle on the map can be plotted and/or verified, to determine the altitude of vehicle. SENSOR_SPEED can be provided using motion sensors, such as accelerometer, gyroscope, and so forth. These hardware components may sample at high frequency and may be used to measure delta, rate of acceleration, and derive speed from the measurements. Other speed sensors can also be used. LOCATION_WITH_NO_GPS can be provided using the GPS chipset with dead reckoning, and can derive actual vehicle location and movement by using a combination of SENSOR_SPEED and CAN_SPEED. Even if GPS is not available, some systems can determine accurately where the vehicle is based on such dead reckoning.

Idling states can be used to determine if vehicle is idling. Idling state monitoring can be performed by monitoring any of the measure techniques described above, such as CAN_SPEED, GPS_SPEED, SENSOR_SPEED, and/or LOCATION_WITH_NO_GPS. Once motion is detected for a threshold time period (e.g., at least 30 seconds) the idle state can be changed. In some examples, actual idling time can also be reported.

Additionally, at least some implementations provide improvement of vehicle fuel usage accuracy. Improvement of vehicle fuel usage accuracy can be accomplished through measurement of altitude using the hardware sensor(s) GPS and/or altimeter. Some implementations may apply the altitude delta to work done by vehicle do derive more accurate fuel usage. Some implementations may measure actual work done at various altitudes. Some implementations can interpolate to accurately determine the actual fuel usage at various altitude levels.

Knowing where the vehicle is at any time can greatly assist in determining whether or not the body is performing functions that are separate from vehicle movement operation, regardless of the functions being performed by the body. On- or off-road solutions, and/or knowing that a body is on private property rather than a road, can be used in the determination. Other techniques can also be used by implementations to provide alternate or enhanced location data, position data, and/or speed data.

Figure 4:
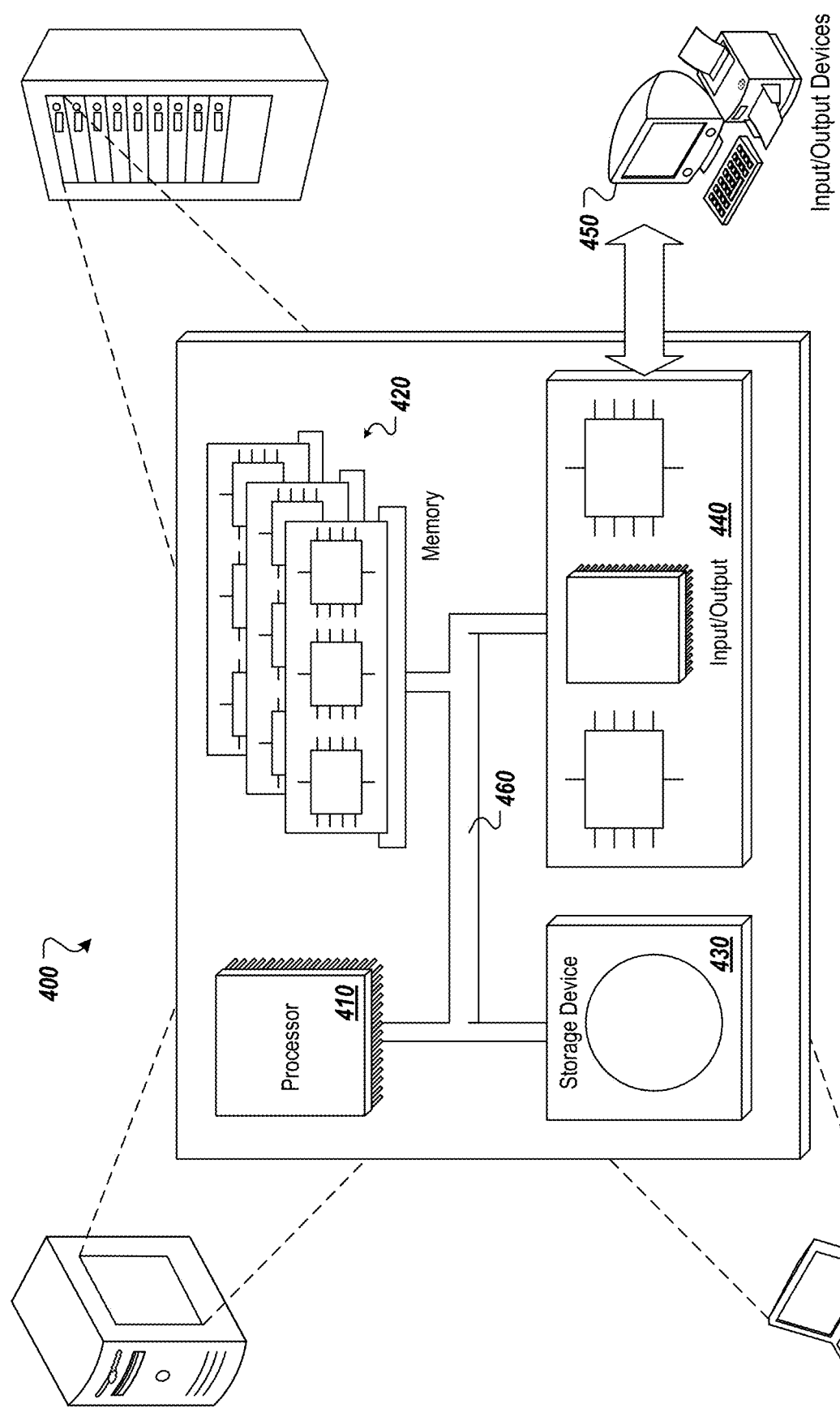
FIG. 4 depicts an example computing system, according to implementations of the present disclosure.

FIG. 4 depicts an example computing system 400, according to implementations of the present disclosure. The system 400 may be used for any of the operations described with respect to the various implementations discussed herein. For example, the system 400 may be included, at least in part, in one or more of the onboard computing device 112, the analysis computing device(s) 120, the output device(s) 126, and/or other computing device(s) or system(s) described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 may execute instructions for the various software module(s) described herein. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A computer-implemented method performed by at least one processor to provide fuel consumption information for a vehicle, the method comprising:
   accessing sensor data that is generated by one or more sensors configured to monitor at least one vehicle component of the vehicle, the sensor data indicating a power-consuming operation performed by the at least one vehicle component, wherein the power-consuming operation is not performed to control translational movement of the vehicle;

analyzing the sensor data to determine an amount of power consumed by the at least one vehicle component to perform the power-consuming operation, including:
identifying, based on the sensor data, a cycle of the power-consuming operation performed by the at least one vehicle component; and
determining the amount of power based at least partly on at least one previously performed measurement of power consumption by the at least one vehicle component while performing the cycle;
determining an amount of fuel consumed by the vehicle to generate the amount of power; and
providing the fuel consumption information that describes the amount of fuel.

2. The method of the claim 1, wherein the power-consuming operation is performed using power from a power take off (PTO), from an engine of the vehicle, to operate the at least one vehicle component.

3. The method of claim 1, further comprising:
receiving location data describing at least one location of the vehicle;
correlating the location data with map information indicating that the at least one location is a private location; and
modifying the amount of fuel to add fuel consumed by the vehicle while at the private location.

4. The method of claim 1, wherein:
the amount of power consumed by the at least one vehicle component is further determined based on at least one environmental condition at a location of the vehicle, and
the at least one environmental condition includes one or more of an air temperature, an air pressure, an altitude, a wind condition, and a precipitation condition.

5. The method of claim 1, wherein the amount of power consumed by the at least one vehicle component is determined based on an average of a plurality of previously performed measurements of the power consumption by the at least one vehicle component while performing the cycle.

6. The method of claim 1, wherein:
the vehicle is a refuse collection vehicle; and
the power-consuming operation is performed to collect refuse.

7. The method of claim 6, wherein the cycle of the power-consuming operation performed by the at least one vehicle component comprises an arm cycle, a pack cycle, a tailgate open event, a tailgate close event, an ejection cycle, or a tailgate locking event.

8. A system comprising:
at least one processor; and
a memory communicatively coupled to the at least one processor, the memory storing instructions which, when executed by the at least one processor, cause the at least one processor to perform actions comprising:
accessing sensor data that is generated by one or more sensors configured to monitor at least one vehicle component of a vehicle, the sensor data indicating a power-consuming operation performed by the at least one vehicle component, wherein the power-consuming operation is not performed to control translational movement of the vehicle;
analyzing the sensor data to determine an amount of power consumed by the at least one vehicle component to perform the power-consuming operation, including:
identifying, based on the sensor data, a cycle of the power-consuming operation performed by the at least one vehicle component; and
determining the amount of power based at least partly on at least one previously performed measurement of power consumption by the at least one vehicle component while performing the cycle;
determining an amount of fuel consumed by the vehicle to generate the amount of power; and
providing fuel consumption information that describes the amount of fuel.

9. The system of claim 8, wherein the power-consuming operation is performed using power from a power take off (PTO), from an engine of the vehicle, to operate the at least one vehicle component.

10. The system of claim 8, wherein the actions further comprise:
receiving location data describing at least one location of the vehicle;
correlating the location data with map information indicating that the at least one location is a private location; and
modifying the amount of fuel to add fuel consumed by the vehicle while at the private location.

11. The system of claim 8, wherein:
the amount of power consumed by the at least one vehicle component is further determined based on at least one environmental condition at a location of the vehicle, and
the at least one environmental condition includes one or more of an air temperature, an air pressure, an altitude, a wind condition, and a precipitation condition.

12. The system of claim 8, wherein the amount of power consumed by the at least one vehicle component is determined based on an average of a plurality of previously performed measurements of the power consumption by the at least one vehicle component while performing the cycle.

13. The system of claim 8, wherein:
the vehicle is a refuse collection vehicle; and
the power-consuming operation is performed to collect refuse.

14. The system of claim 13, wherein the cycle of the power-consuming operation performed by the at least one vehicle component comprises an arm cycle, a pack cycle, a tailgate open event, a tailgate close event, an ejection cycle, or a tailgate locking event.

15. One or more computer-readable storage media storing instructions which, when executed by at least one processor, cause the at least one processor to perform actions comprising:
accessing sensor data that is generated by one or more sensors configured to monitor at least one vehicle component of a vehicle, the sensor data indicating a power-consuming operation performed by the at least one vehicle component, wherein the power-consuming operation is not performed to control translational movement of the vehicle;
analyzing the sensor data to determine an amount of power consumed by the at least one vehicle component to perform the power-consuming operation, including:
identifying, based on the sensor data, a cycle of the power-consuming operation performed by the at least one vehicle component; and
determining the amount of power based at least partly on at least one previously performed measurement of power consumption by the at least one vehicle component while performing the cycle;

determining an amount of fuel consumed by the vehicle to generate the amount of power; and providing fuel consumption information that describes the amount of fuel.

16. The computer-readable storage media of claim 15, wherein:

the vehicle is a refuse collection vehicle; and the power-consuming operation is performed to collect refuse.

17. The computer-readable storage media of claim 15, wherein the power-consuming operation is performed using power from a power take off (PTO), from an engine of the vehicle, to operate the at least one vehicle component.

18. The computer-readable storage media of claim 15, wherein the actions further comprise:

receiving location data describing at least one location of the vehicle;

correlating the location data with map information indicating that the at least one location is a private location; and modifying the amount of fuel to add fuel consumed by the vehicle while at the private location.

19. The computer-readable storage media of claim 15, wherein:

the amount of power consumed by the at least one vehicle component is further determined based on at least one environmental condition at a location of the vehicle, and the at least one environmental condition includes one or more of an air temperature, an air pressure, an altitude, a wind condition, and a precipitation condition.

20. The computer-readable storage media of claim 15, wherein the amount of power consumed by the at least one vehicle component is determined based on an average of a plurality of previously performed measurements of the power consumption by the at least one vehicle component while performing the cycle.

* * * * *